(12) United States Patent
Manstein et al.

(10) Patent No.: US 9,180,394 B2
(45) Date of Patent: Nov. 10, 2015

(54) MULTI-LAYER COMPOSITE FOR USE IN AN AIR FILTER

(75) Inventors: Heiko Manstein, Speyer (DE); Robert Groten, Sundhofen (FR); Anthony Hollingsworth, Birkenau (DE); Ingrid Ewald, Hirschberg (DE); Joachim Hendler, Weinheim (DE); Klaus Veeser, Weinheim (DE)

(73) Assignee: CARL FREUDENBERG KG, Weinheim (DE)

( * ) Notice: Subject to any disclaimer, the term of this patent is extended or adjusted under 35 U.S.C. 154(b) by 355 days.

(21) Appl. No.: 12/598,088

(22) PCT Filed: Mar. 13, 2008

(86) PCT No.: PCT/EP2008/002005
§ 371 (c)(1),
(2), (4) Date: Oct. 29, 2009

(87) PCT Pub. No.: WO2008/141687
PCT Pub. Date: Nov. 27, 2008

(65) Prior Publication Data
US 2010/0119794 A1 May 13, 2010

(30) Foreign Application Priority Data
May 21, 2007 (DE) .......................... 10 2007 023 806

(51) Int. Cl.
*B01D 39/16* (2006.01)
*D04H 3/11* (2012.01)
(Continued)

(52) U.S. Cl.
CPC .............. *B01D 39/163* (2013.01); *B01D 46/02* (2013.01); *B32B 5/022* (2013.01); *B32B 5/06* (2013.01);
(Continued)

(58) Field of Classification Search
CPC .................. B01D 2046/2433; B01D 46/546; B01D 46/00; B01D 39/08; B01D 39/083; B01D 2239/0627; B01D 2239/064; B01D 2239/065; B01D 2239/0063; B01D 2275/10; B01D 2046/2437; B01D 2201/18–2201/184; B01D 2239/1216; B01D 2230/1233; D04H 3/00–3/166; B32B 5/26
USPC ......... 442/384, 340, 361, 381, 382, 401, 408; 428/219
See application file for complete search history.

(56) References Cited

U.S. PATENT DOCUMENTS 4,523,995 A * 6/1985 Pall et al. ................. 210/504
4,714,647 A * 12/1987 Shipp et al. ................ 428/212
(Continued)

FOREIGN PATENT DOCUMENTS

DE 3812849 10/1989
DE 4410110 11/1995
(Continued)

OTHER PUBLICATIONS

Filament definition, Textile Glossary, Celanese Acetate, copyright 2001.*
(Continued)

*Primary Examiner* — Jennifer A Steele
(74) *Attorney, Agent, or Firm* — Grossman, Tucker, Perreault & Pfleger, PLLC

(57) ABSTRACT

The invention relates to a multi-layer composite for use in an air filter, comprising at least one upstream ply and a support ply that is connected to the upstream ply. The upstream ply is made of a non-woven fabric and has a finer porosity than the support ply. The aim of the invention is to form and further develop a multi-layer composite for use in an air filter, in particular in a filter bag in such a manner that the upstream ply can be connected in a stable and economical manner to the support ply. The invention is characterised in that the upstream ply is embodied as a spun bonded non-woven, the continuous filaments of which are at least partially twisted or interwoven with the support ply.

9 Claims, 3 Drawing Sheets

(51) Int. Cl.
    *D04H 3/016*     (2012.01)
    *B32B 5/06*     (2006.01)
    *B32B 5/26*     (2006.01)
    *B32B 5/02*     (2006.01)
    *B01D 46/02*     (2006.01)
    *B01D 39/02*     (2006.01)

(52) U.S. Cl.
    CPC  *B32B 5/26* (2013.01); *D04H 3/016* (2013.01); *D04H 3/11* (2013.01); *B01D 39/02* (2013.01); *B01D 2239/065* (2013.01); *B01D 2239/0663* (2013.01); *B01D 2275/10* (2013.01); *Y10T 428/249922* (2015.04); *Y10T 442/611* (2015.04); *Y10T 442/614* (2015.04); *Y10T 442/66* (2015.04); *Y10T 442/663* (2015.04); *Y10T 442/681* (2015.04); *Y10T 442/689* (2015.04)

(56) References Cited

U.S. PATENT DOCUMENTS

| | | | |
|---|---|---|---|
| 5,283,106 A * | 2/1994 | Seiler et al. | 428/198 |
| 5,609,947 A * | 3/1997 | Kamei et al. | 428/212 |
| 5,721,180 A * | 2/1998 | Pike et al. | 442/346 |
| 6,183,670 B1 * | 2/2001 | Torobin et al. | 264/6 |
| 6,387,141 B1 | 5/2002 | Hollingsworth et al. | |
| 6,395,046 B1 * | 5/2002 | Emig et al. | 55/382 |
| 6,903,034 B1 * | 6/2005 | Putnam et al. | 442/408 |
| 7,008,465 B2 * | 3/2006 | Graham et al. | 95/78 |
| 7,153,793 B2 * | 12/2006 | Willis et al. | 442/337 |
| 7,691,168 B2 * | 4/2010 | Fox et al. | 55/528 |
| 7,902,096 B2 * | 3/2011 | Brandner et al. | 442/400 |
| 2001/0003082 A1 * | 6/2001 | Kahlbaugh et al. | 442/340 |
| 2005/0202744 A1 * | 9/2005 | Putnam et al. | 442/408 |
| 2006/0019570 A1 * | 1/2006 | Groten et al. | 442/401 |
| 2007/0207317 A1 * | 9/2007 | Willingham et al. | 428/375 |
| 2008/0003912 A1 * | 1/2008 | Pourdeyhimi et al. | 442/340 |
| 2008/0274312 A1 * | 11/2008 | Schelling et al. | 428/34.5 |

FOREIGN PATENT DOCUMENTS

| | | |
|---|---|---|
| DE | 19843000 | 4/2000 |
| DE | 20321162 | 5/2006 |
| DE | 202005019004 | 5/2007 |
| EP | 0333228 | 9/1989 |
| EP | 1795248 | 3/2008 |
| JP | 07144109 | 6/1995 |
| JP | 2001192936 | 7/2001 |
| WO | 0149914 | 7/2001 |

OTHER PUBLICATIONS

International Search Report and Written Opinion dated Mar. 30, 2009 issued in related International Patent Application No. PCT/EP2008/002005.

* cited by examiner

MULTI-LAYER COMPOSITE FOR USE IN AN AIR FILTER

TECHNICAL FIELD

The invention relates to a multilayer composite for use in an air filter, comprising at least one upstream ply and one supporting ply connected to this, the upstream ply being manufactured from nonwoven and having a finer porosity than the supporting ply.

BACKGROUND

Multilayer composites of this type are employed in filter bags and bag filter installations. Bag filter installations are often used for the purification of dust-containing gases in power stations. In a bag filter installation, a plurality of filter bags are arranged. In this case, the filter bags are tension-mounted on a supporting body which is located on the clean gas side. When the flow passes through the filter bags from the crude gas side to the clean gas side, dust is retained on the crude gas side of the filter bag. The purified gas passes through the filter bag onto the clean gas side.

Filter bags of this type are clogged by a dust cake after a certain operating time. The dust cake is located on the side facing the crude gas side of the filter bag. The filter bags can then be cleaned off by means of pressure pulses from the clean gas side. As a result of these pressure pulses, the filter cake adhering to the filter bags comes loose and falls into a dust collection container on the crude gas side.

It is known to deposit a fiber nap as an upstream ply on a supporting ply. Nonwovens consisting of staple fibers are known as fiber naps. A nonwoven consisting of staple fibers is often connected thermally to the supporting ply and processed to form a laminate. This measure is necessary in order to give the multilayer composite a sufficient stability against pressure pulses. The upstream ply is to be prevented from coming loose from the supporting ply.

It is in this case a disadvantage that, due to the thermal bonding, the multilayer composite obtained, on the one hand, is brittle and difficult to move and, on the other hand, can be manufactured only in a complicated way.

Furthermore, for the manufacture of filter bags, multilayer composites consisting of one supporting layer and of two staple fiber nonwovens are often selected. In these, the staple fiber nonwovens are connected to the supporting layer and to one another by means of mechanical needling.

It is in this case a disadvantage that the multilayer composite has as a consequence of production penetration points which increase the permeability to dust particles. It is also a disadvantage that, in order to manufacture such a multilayer composite, only relatively coarse fibers with a fineness which allows a carding of the fibers can be used.

SUMMARY

The object on which the invention is based, therefore, is to refine and develop a multilayer composite for use in an air filter, in particular in a filter bag, of the type initially mentioned, in such a way that a stable connection of the upstream ply to the supporting ply, along with cost-effective production, can be implemented.

Accordingly, a multilayer composite for use in an air filter, in particular in a filter bag, of the type initially mentioned is characterized in that the upstream ply is configured as a spunbonded nonwoven, the continuous filaments of which are at least partially twisted or interwoven with the supporting ply.

According to the invention, it was recognized that an upstream ply consisting of spunbonded nonwoven can be produced in a continuous extrusion method. This extrusion method gives rise to continuous filaments which can be at least partially twisted or interwoven with a supporting ply, in that the continuous filaments are introduced into the supporting ply by means of water jets. According to the invention, in particular, it was recognized that the configuration of the upstream ply as a spunbonded nonwoven allows a continuous manufacture of the multilayer composite. Furthermore, it was recognized that, in particular, continuous filaments make it possible to have an especially firm bond of the upstream ply to the supporting ply. Finally, it was recognized that the supporting ply used may be any woven fabric, knitted fabric or any textile mesh structure, the porosity of which is higher than the porosity of the upstream ply. The configuration of the upstream ply as a spunbonded nonwoven makes it possible to set the porosity of the upstream ply according to the requirement profile. In this case, the porosity of the upstream ply may be set in such a way that as many small pores as possible are present, the distribution curve of the pore diameters being extremely narrow. The object initially mentioned is consequently achieved.

Fine porosity in the context of this application is understood to mean a pore structure which is characterized by very small pore diameters, as many pores as possible having similar pore diameters and thereby exhibiting a narrow distribution curve. In this case, an upstream ply exhibits finer porosity than a supporting ply when the mean pore diameter of the upstream ply is lower than the mean pore diameter of the supporting ply. Preferably, the distribution curve of the pore diameters of the upstream ply is very narrow in comparison with that of the supporting ply. Preferably, the mean pore diameter of the supporting ply is at least twice as large as the mean pore diameter of the upstream ply. By means of such a multilayer composite, effective dust separation can be implemented, without the supporting ply being clogged by particles which have not been separated on the upstream ply.

The supporting ply could be configured as a spunbonded nonwoven, the continuous filaments of which have mean diameters which are larger than the mean diameters of the upstream ply. By means of this actual configuration, an especially firm bond of the upstream ply to the supporting ply can be implemented, since continuous filaments can easily be twisted with one another. Against this background, it is conceivable, in concrete terms, that both the supporting ply and the upstream ply are manufactured continuously in an extrusion spinning method and are twisted with one another by means of water jets. As a result of the water jet treatment, especially fine continuous filaments can be interwoven homogeneously with a supporting ply, without ducts arising, such as occur in a mechanical needling technique.

The upstream ply could comprise continuous filaments with a mean diameter of 0.3 to 10 μm, preferably <7 μm. Selecting the continuous filaments from the range of 0.3 to 10 μm has proved to be particularly advantageous in order to give the upstream ply a fine porosity. By the continuous filaments being selected from this diameter range, effective dust separation is implemented. In particular, it was recognized that especially good fine dust separation can be achieved if the mean diameter of the continuous filaments of the upstream ply is smaller than 7 μm.

The multilayer composite could have a weight per unit area of at most 500 g/m$^2$, preferably at most 300 g/m$^2$. Such a weight per unit area has proved to be advantageous in order to prevent a mechanical blockage of the multilayer composite by intercollated dust. Furthermore, by means of such a weight per unit area, the quantity of raw materials, which is required for manufacturing a multilayer composite, can be reduced.

Against this background, it is conceivable that the upstream ply has a weight per unit area of 20 to 100 g/m². By virtue of this actual configuration, a multilayer composite, which has a high separation performance, can be produced, using a particularly small amount of raw materials.

The supporting ply could comprise continuous filaments with a titer higher than 3 dtex, preferably higher than 5 dtex. By the titer of the continuous filaments being selected from this range, a sufficiently coarse-pored supporting ply is provided which transmits particles not separated by the upstream layer, without becoming blocked. Furthermore, by means of continuous filaments having this titer, a sufficiently stable supporting ply can be built up which can reliably support an upstream ply of particularly low weight per unit area and low stability and can bind this upstream ply to itself in the case of relatively high pressure pulses.

The continuous filaments of the upstream ply could be designed as split fibers, to be precise as constituents, at least partially isolated from one another, of multi-component continuous filaments. By virtue of this actual configuration, it is possible to split up or cleave continuous filaments of the upstream ply by means of water jet needling or water jet treatment and reduce their diameters. In one step, the continuous filaments of the upstream ply can be cleft on the one hand and at the same time interwoven with the supporting ply.

Against this background, it is conceivable that the continuous filaments are designed as constituents, at least partially isolated from one another, of bicomponent continuous filaments. Bicomponent continuous filaments are easily available commercially. Against this background, in most concrete terms, it is conceivable that the bicomponent continuous filaments are in the form of pie continuous filaments or island-in-the-sea continuous filaments. Bicomponent continuous filaments of the type mentioned can easily be split up by means of water jets. A multiplicity of very thin continuous filaments can thereby be manufactured from originally relatively thick continuous filaments.

Against this background, it is conceivable that the continuous filaments are formed from or divided out from multi-component continuous filaments by means of mechanical, thermal or chemical treatment.

The continuous filaments could be formed from the multi-component continuous filaments by means of water jet treatment. As a result of the water jet treatment, originally relatively thick continuous filaments can be cleft into very fine continuous filaments carefully and virtually non-destructively. A spunbonded nonwoven of very fine porosity can thereby be manufactured. Furthermore, the water jet treatment advantageously ensures that no ducts through which dust particles can pass occur.

The continuous filaments could have a triangular cross section. Continuous filaments of this type could be split up from a pie continuous filament by water jet treatment. Continuous filaments of triangular cross section have a surface 1.75 times larger than that of a continuous filament of round cross section. An upstream ply can thereby be manufactured which forms a very large surface and therefore a large area of adhesion.

The continuous filaments could form a surface which occurs due to the mechanical or thermal bonding of at least some of the continuous filaments. By virtue of this actual configuration, a surface can be provided which is smooth and abrasion-resistant. Furthermore, such a surface exhibits anti-adhesive properties and makes it easier to detach a dust cake from a filter bag which is manufactured from a multilayer composite of the type described here.

In the supporting layer, in addition to the structure-forming continuous filaments, binding fibers could also be present which have a lower melting point than the continuous filaments of the supporting ply. The structure-forming continuous filaments of the supporting ply give the latter its structure and porosity. The binding fibers could be designed preferably as core/sheath fibers or side-by-side fibers which bond with the continuous filaments under the action of heat. By virtue of this actual configuration, a stable supporting ply can be manufactured. It is also conceivable that the entire supporting ply consists solely of bicomponent continuous filaments, the lower-melting component making the bond between the continuous filaments. Advantageously, in this case, no regions free of binding fibers arise, and therefore an especially stable supporting ply of uniform construction can be implemented. The selection of the weight per unit area of the supporting ply is made in light of the mechanical requirements to be satisfied by the multilayer composite. The arrangement of coarser continuous filaments into a relatively open-pored nonwoven structure prevents the situation where fine dust settles in the supporting ply and blocks the latter. This would result in a sharp rise in the pressure difference between the crude gas side and the clean gas side.

The multilayer composite could have a three-ply construction, the third ply being designed in a similar way to the upstream ply. An especially high filter efficiency can thereby be achieved. Against this background, it is conceivable that the supporting ply is manufactured from scrim. Scrim is distinguished by high stability and can easily be twisted with continuous filaments by means of water jets.

A third ply consisting of nanofibers or microfibers can be positioned on the upstream ply. In the context of this application, nanofibers are understood to mean fibers with a mean diameter of 50 to 300 nm. Microfibers are understood to mean fibers, the titer of which is <1 dtex. By virtue of this actual configuration, the filter efficiency can be further increased, along with an insignificant rise in the pressure difference between the crude gas side and clean gas side. A nanofiber or microfiber ply of low stability could be protected by a coarse-fiber covering ply.

Against this background, it is also conceivable that the ply consisting of nanofibers or microfibers follows the supporting ply. In this actual case, the supporting ply is positioned in the manner of a sandwich between the third ply consisting of nanofibers or microfibers and the upstream ply.

It is conceivable, on a spunbonded nonwoven plant having a plurality of spinneret series, to spin from some of the spinneret series coarse bicomponent continuous filaments of the core/sheet type which function as a supporting ply in the finished multilayer composite. Pie continuous filaments can be produced by means of the remaining spinneret series, the upstream ply and supporting ply being connected to one another by means of water jets. Furthermore, the pie continuous filaments of the upstream ply are split up or cleft into individual continuous filaments by means of the water jet needling.

For the production of the pie continuous filaments or orange continuous filaments or island-in-the-sea continuous filaments of the upstream ply, polymers are used which make it possible to cleave said continuous filaments easily. For manufacturing the continuous filaments of the supporting ply, polymers are preferably used which bring about a good bonding of the continuous filaments with one another. Furthermore, the supporting ply is to have high porosity with relatively coarse pores. Core/sheath continuous filaments are preferably used for this purpose.

Against this background, it is conceivable, in concrete terms, to manufacture the spunbonded nonwovens from the polymers polyester, polyamide, polyamide 6, polyamide 6.6, polyethylene, syndiotactic polystyrene and/or mixtures of these polymers.

The multilayer composites described here can fulfill the mechanical and filter requirements in an air filter plant or in a filter bag with a weight per unit area of <300 g/m². By contrast, the standard needled nonwovens have weights >500 g/m² and have to be reinforced with woven fabrics or knitted fabrics in order to improve their mechanical stability. Advantageously, continuous filaments can be spun in a single-stage process from a polymer granulate and be deposited and bonded to form a nonwoven.

Against this background, it is conceivable to give the multilayer composite an oil-repellent finish. In this case, there is no need for subsequent impregnation, since additives for oil repellency can be introduced into an extruder even at the time when the continuous filaments are produced. The same applies to a water-repellent finish. Even during dyeing, there is no need for subsequent dyeing, since pigments can be introduced into an extruder even at the time when the continuous filaments are produced.

It is also conceivable, in concrete terms, to produce a two-ply multilayer composite in a single-stage process with a progressive build-up both in the upstream ply and in the supporting ply. In this case, a progressive build-up is understood to mean the formation of a gradient with respect to the continuous filament thickness, density or porosity.

The multilayer composites described here and methods for producing the multilayer composites are especially suitable for producing thin, rigid and therefore pleatable filter media which exhibit a low weight per unit area, a low thickness and higher rigidity than needled nonwovens.

There are, then, various possibilities for refining and developing the teaching of the present invention in an advantageous way. Reference is to be made in this respect, on the one hand, to the subsidiary claims and, on the other hand, to the following explanation of preferred exemplary embodiments of the invention, with reference to the drawing and the table.

In conjunction with the explanation of the preferred exemplary embodiments of the invention, with reference to the drawing and the table, preferred refinements and developments of the teaching are also explained in general terms.

DETAILED DESCRIPTION

Figure 1:
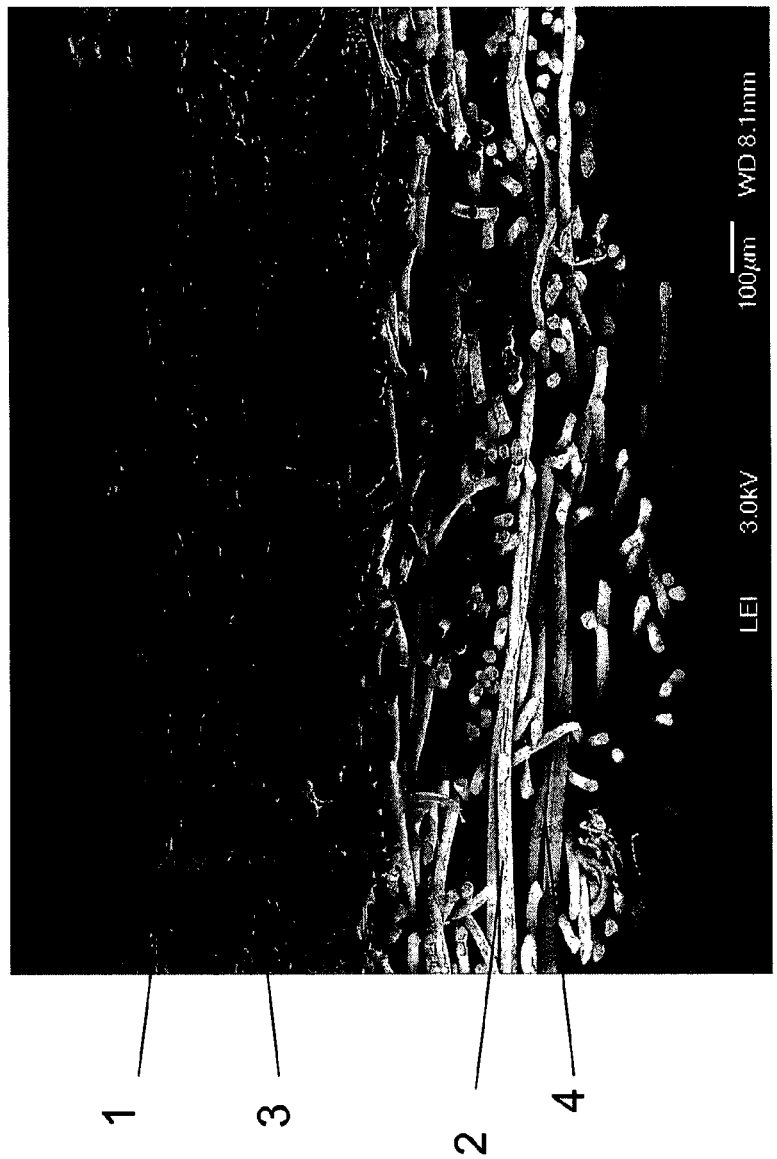
FIG. 1 shows a scanning electron microscope (REM) photograph of a multilayer composite in which both the upstream ply and supporting ply are manufactured from a spunbonded nonwoven.

FIG. 1 shows a scanning electron microscope photograph of a multi-layer composite for use in an air filter, in particular in a filter bag, with an upstream ply 1 consisting of nonwoven. The upstream ply 1 has a finer porosity than the supporting ply 2. The upstream ply 1 is configured as a spunbonded nonwoven, continuous filaments 3 of which are at least partially twisted or interwoven with the supporting ply 2. The supporting ply 2 is configured as a spunbonded nonwoven, the continuous filaments 4 of which have mean diameters which are larger than the mean diameters of the continuous filaments 3 of the upstream ply 1. The continuous filaments 3 of the upstream ply 1 are twisted with the supporting ply 2 by means of water jet treatment. Both the upstream ply 1 and the supporting ply 2 are manufactured from a spunbonded nonwoven which was produced in an extrusion spinning method.

The upstream ply 1 has continuous filaments 3 with a mean diameter of 0.3 to 10 µm. The multilayer composite according to FIG. 1 has a weight per unit area of 272 g/m². Furthermore, it has a maximum tensile force in the longitudinal direction of 936 N/50 mm. The multilayer composite has a maximum tensile force in transverse direction of 754 N/50 mm. The multilayer composite according to FIG. 1 is 1.06 mm thick and has an air permeability of 292 m³/m²h at 200 Pa. Said values were determined according to the DIN standards (test regulations) according to the table and can be gathered from this. The multilayer composite according to FIG. 1 is designated in the table as a two-ply Evolon Medium.

The supporting ply 2 has continuous filaments 4 with a titer higher than 3 dtex. The continuous filaments 3 are in the form of constituents, at least partially isolated from one another, of bicomponent continuous filaments. The continuous filaments 3 are formed from the bicomponent continuous filaments by means of water jet treatment. The bicomponent continuous filaments used were pie continuous filaments.

Figure 2:
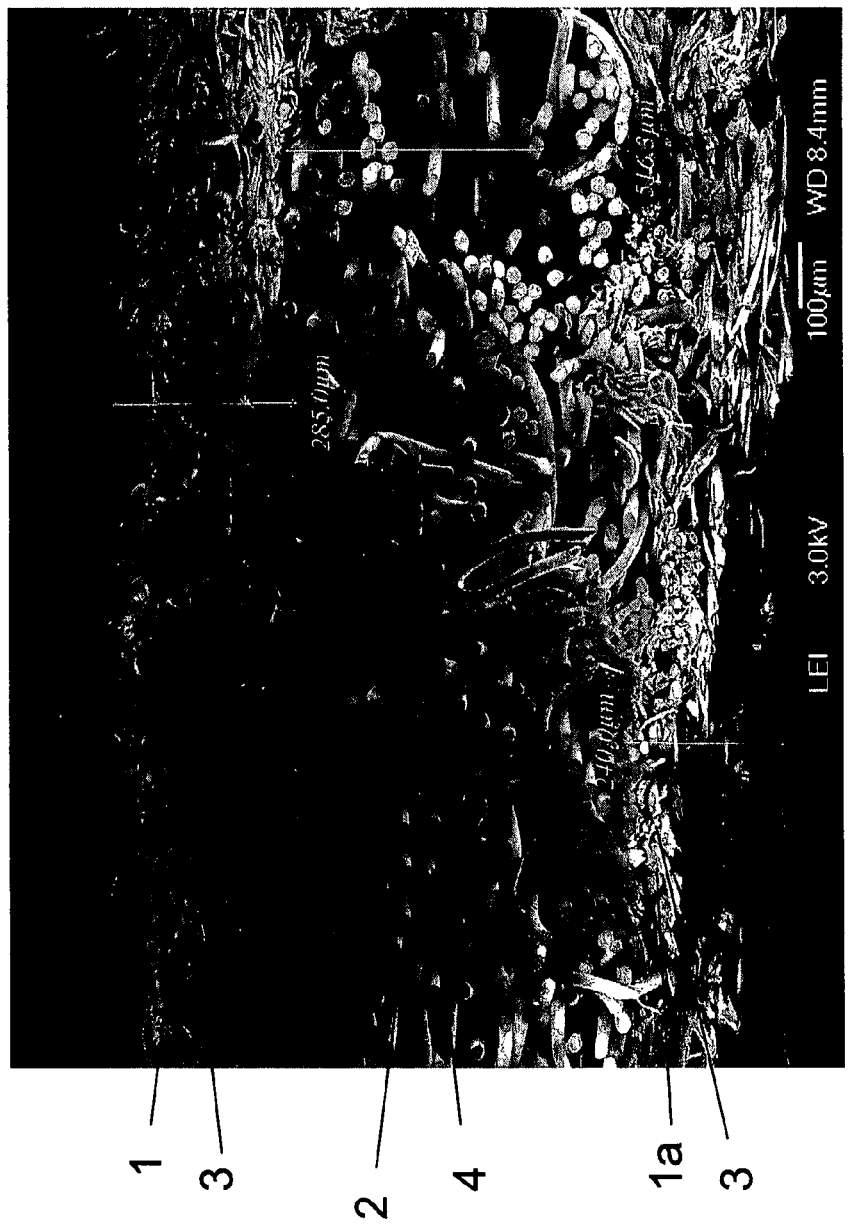
FIG. 2 shows an REM photograph of a three-ply multilayer composite consisting of an upstream ply, a supporting ply and a third ply which is manufactured in a similar way to the upstream ply.

FIG. 2 shows a multilayer composite with an upstream ply 1, a supporting ply 2 and a further ply 1a which is manufactured in a similar way to the upstream ply 1. The upstream ply 1 has a finer porosity than the supporting ply 2. The upstream ply 1 is configured as a spunbonded nonwoven, the continuous filaments 3 of which are at least partially twisted or interwoven with the supporting ply 2. The supporting ply 2 is configured as a spunbonded nonwoven, the continuous filaments 4 of which have mean diameters which are larger than the mean diameters of the continuous filaments 3 of the upstream ply 1. The continuous filaments 3 of the upstream ply 1 and of the ply 1a are twisted with the supporting ply 2 by means of water jet treatment. The upstream ply 1, the ply 1a and the supporting ply 2 are manufactured from a spunbonded nonwoven which was produced in an extruding spin method. The thickness, weight per unit area and air permeability of the three-ply multilayer composite may be gathered from the table. The multilayer composite according to FIG. 2 is designated in the table as a three-ply Evolon Medium.

The multilayer composite according to FIG. 2 has a weight per unit area of 269 g/m². The weight per unit area was measured according to DIN EN 29073-01. Furthermore, this multilayer composite has an air permeability of 353 m³/m²h at 200 Pa. This air permeability was measured according to DIN EN ISO 9237. The thickness of the multilayer composite according to FIG. 2 amounts to 1.03 mm. The multilayer composite according to FIG. 2 has a maximum tensile force in the longitudinal direction of 796 N/50 mm. It has a maximum tensile force in the transverse direction of 622 N/50 mm. The maximum tensile forces were determined according to DIN EN 29073-3.

Figure 3:
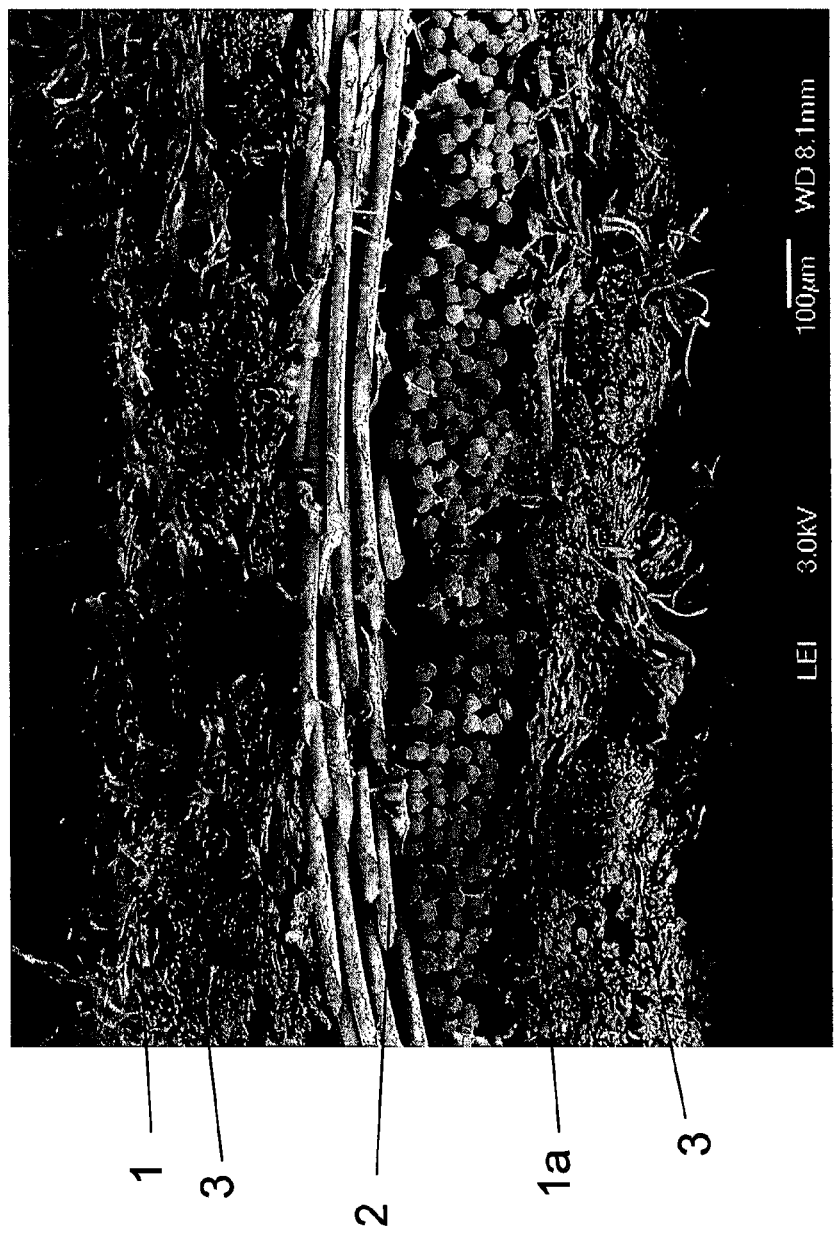
FIG. 3 shows an REM photograph of a three-ply multilayer composite consisting of an upstream ply, a supporting ply made from scrim and a third ply which is manufactured in a similar way to the upstream ply.

FIG. 3 shows a multilayer composite consisting of an upstream ply 1 and of a supporting ply 2 which is configured as scrim. The supporting ply 2 is followed by a further ply 1a which is manufactured in a similar way to the upstream ply 1.

The upstream ply 1 according to FIG. 3 corresponds in its set-up to the upstream plies 1 described in FIG. 1 and FIG. 2.

Furthermore, the table shows the data of a needle felt. This has a weight per unit area of 500 g/m² and consists of two fiber layers which enclose a multifilament mesh having a weight per unit area of 100 g/m². The multifilament mesh has a porosity of 80% according to DIN 53855. The fibers of the two fiber layers have a titer of 1.5 to 3 dtex.

With regard to further advantageous refinements and developments of the teaching according to the invention, reference is made, on the one hand, to the general part of the description and, on the other hand, to the patent claims.

Finally, it will most particularly be stressed that the exemplary embodiments selected above purely arbitrarily serve merely for explaining the teaching according to the invention, but do not restrict this to these exemplary embodiments.

TABLE

| | General particulars prior to the test | | | | | | | | | |
|---|---|---|---|---|---|---|---|---|---|---|
| | Test regulation | | | | | Test: with reference to VDI 3926, October 2004 edition, with microcalciline as test dust | | | | |
| | | DIN EN ISO 9237 | | DIN EN 29073/3 | DIN EN 29073/3 | Prior to aging Results after 30 filtration cycles | | | After aging Results after 30 filtration cycles | | |
| Filter medium | DIN EN 29073-01 Weight g/m² | Air permeability [200 Pa] m³/m²h | DIN EN ISO 9073-2 Thickness mm | Maximum tensile force, longitudinally N/50 mm | Maximum tensile force, transversely N/50 mm | Cycle time s | Static pressure loss Pa | Dust concentration in clean gas mg/m³ | Cycle time s | Static pressure loss Pa | Dust concentration in clean gas mg/m |
| 500 g/m² needle felt (100 g context) | 484 | 383 | 1.80 | 1000 | 800 | 499 | 71 | 0.583 | 391 | 233 | 0.011 |
| 3-ply Evolon Medium | 269 | 353 | 1.03 | 796 | 622 | 729 | 153 | 0.089 | 607 | 361 | 0.000* |
| 2-ply Evolon Medium | 272 | 292 | 1.06 | 936 | 754 | 567 | 194 | 0.030 | 406 | 492 | 0.000* |

*Below detection limit

Residual pressure losses (static pressure losses according to the table) and dust concentrations on the clean gas side were measured with microcalciline as the test dust with reference to the standard VDI 3926, October 2004 edition. In this case, the values of the residual pressure losses and dust concentrations in the clean gas were measured after 30 filtration cycles and are presented in the table.

Two test series were conducted, to be precise before and after the aging of the multilayer composites. In this case, a cycle time corresponds to the time required in order to clog a multilayer composite with dust in such a way that a static final pressure loss of 1000 Pa is reached. According to the table, for example, the three-ply Evolon Medium requires 729 s in order to change from a residual pressure loss of 153 Pa to the static final pressure loss of 1000 Pa.

It can be gathered from the table that the multilayer composites according to the invention give rise to markedly lower dust concentrations in the clean gas than the multilayer composite which was used for comparison. In particular, after aging of the multilayer composites, the multilayer composites according to the invention are well below the detection limit with respect to the dust concentration in the clean gas. As a result, it can be gathered from the table that, in the case of an insignificantly lower maximum tensile force in the longitudinal direction and in the transverse direction, the multilayer composites according to the invention give rise to a significantly lower dust concentration in the clean gas than the multilayer composite which was used for comparison. This detected stability of the multilayer composites according to the invention, along with an efficient filter performance and the capacity for continuous production, is evidence of their suitability as a filter medium for air filter applications, in particular for filter bags.

What is claimed is:
1. A multilayer composite air filter material, consisting of:
a first upstream ply, wherein the at least one upstream ply has a weight per unit area of 20 to 100 g/m² and includes continuous microfilaments having a mean diameter of 0.3 to less than 7 μm;
one supporting ply comprising a continuously extruded spunbonded nonwoven connected to said at least one upstream ply and includes continuous filaments having a titer of higher than 5 dtex; and
a second upstream ply having a continuously extruded spunbond nonwoven having continuous nanofilaments having a mean diameter of about 50 to 300 nm; and wherein
the supporting ply has a mean pore diameter at least two times the size of a mean pore diameter of the upstream ply;
a mean pore diameter of the support ply is at least twice as large as the mean pore diameter of the first or second upstream ply,
at least a portion of the continuous filaments of the first or second upstream ply are homogeneously twisted or interwoven with at least a portion of the continuous filaments of the supporting ply so as to continuously and uniformly bond said first or second upstream ply to said supporting ply without introducing ducts through which dust particles can pass through the at least one upstream ply and into the supporting ply; and
said multilayer composite has a weight per unit area of about 300-500 g/m².
2. The multilayer composite as claimed in claim 1, wherein the continuous filaments of the first or second upstream ply are twisted with the supporting ply by means of water jet treatment.

3. The multilayer composite of claim 1, wherein the continuous filaments of the first or second upstream ply comprise split fibers of multi-component continuous filaments, wherein said split fibers are at least partially isolated from one another.

4. The multilayer composite of claim 3, wherein the continuous filaments of the first or second upstream ply are constituents of bicomponent continuous filaments and are at least partially isolated from one another.

5. The multilayer composite of claim 3, wherein the continuous filaments of the first or second upstream ply are formed from or divided out from multi-component continuous filaments by means of mechanical, thermal or chemical treatment.

6. The multilayer composite of claim 3, wherein the continuous filaments of the first or second upstream ply are formed from the multi-component continuous filaments by means of water jet treatment.

7. The multilayer composite of claim 1, wherein the continuous filaments of the first or second upstream ply have a triangular cross section.

8. The multilayer composite of claim 1, further comprising a surface formed by mechanical or thermal bonding of at least a portion of the continuous filaments of the first or second upstream ply.

9. A multilayer composite air filter material, consisting of:
a first upstream ply, wherein the at least one upstream ply has a weight per unit area of 20 to 100 g/m² and includes continuous microfilaments having a mean diameter of 0.3 to less than 7 μm;
one supporting ply comprising a continuously extruded spunbonded nonwoven connected to said at least one upstream ply and includes continuous filaments having a titer of higher than 5 dtex; and
a second ply having a continuously extruded spunbond nonwoven having continuous nanofilaments having a mean diameter of about 50 to 300 nm; and wherein
the supporting ply has a mean pore diameter at least two times the size of a mean pore diameter of the upstream ply wherein the support ply is sandwiched between said first and second ply;
a mean pore diameter of the support ply is at least twice as large as the mean pore diameters of the first or second upstream ply,
at least a portion of the continuous filaments of the first or second upstream ply are homogeneously twisted or interwoven with at least a portion of the continuous filaments of the supporting ply so as to continuously and uniformly bond said first or second upstream ply to said supporting ply without introducing ducts through which dust particles can pass through the at least one upstream ply and into the supporting ply; and
said multilayer composite has a weight per unit area of about 300-500 g/m².

* * * * *